United States Patent
Chang et al.

(10) Patent No.: US 8,502,472 B2
(45) Date of Patent: Aug. 6, 2013

(54) LIGHT EMITTING DIODE DRIVING APPARATUS AND METHOD FOR HOLDING DRIVING VOLTAGE THEREOF

(75) Inventors: Tsung-Hau Chang, Hsinchu (TW); Chia-Lin Chiu, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 352 days.

(21) Appl. No.: 13/028,197

(22) Filed: Feb. 15, 2011

(65) Prior Publication Data
US 2012/0139439 A1 Jun. 7, 2012

(30) Foreign Application Priority Data
Dec. 3, 2010 (TW) ............................. 99142169 A

(51) Int. Cl.
*H05B 37/02* (2006.01)
(52) U.S. Cl.
USPC ........................... 315/307; 315/224; 315/291
(58) Field of Classification Search
USPC ................. 315/200 R, 209 R, 224, 291, 307, 315/360–363
See application file for complete search history.

(56) References Cited

U.S. PATENT DOCUMENTS
8,111,017 B2 * 2/2012 Lin et al. ....................... 315/307
* cited by examiner

*Primary Examiner* — Jimmy Vu
(74) *Attorney, Agent, or Firm* — Jianq Chyun IP Office

(57) ABSTRACT

A light emitting diode (LED) driving apparatus is disclosed. The LED driving apparatus includes a power converter, a voltage sample-and-hold and comparison circuit, and a pre-charge clock generator. The power converter has a power transistor switch for processing power conversion and outputs a driving voltage at an output terminal. The voltage sample-and-hold and comparison circuit enters a sample-and-hold mode or a comparing mode according to a dimming status signal. The voltage sample-and-hold and comparison circuit samples and holds a feedback voltage to obtain a pre-storage voltage during the sample-and-hold mode and compares the pre-storage voltage with the feedback voltage to obtain a comparison result during the comparing mode. The voltage sample-and-hold and comparison circuit generates a pre-charge enable signal according to the comparison result. The pre-charge clock generator generates a pre-charge clock signal to control the power transistor switch according to the pre-charge enable signal and a clock signal.

11 Claims, 5 Drawing Sheets

LIGHT EMITTING DIODE DRIVING APPARATUS AND METHOD FOR HOLDING DRIVING VOLTAGE THEREOF

CROSS-REFERENCE TO RELATED APPLICATION

This application claims the priority benefit of Taiwan application serial no. 99142169, filed on Dec. 3, 2010. The entirety of the above-mentioned patent application is hereby incorporated by reference herein and made a part of this specification.

BACKGROUND

1. Field of the Invention

The invention relates to a light emitting diode (LED) driving apparatus. Particularly, the invention relates to a method for holding a driving voltage of a LED driving apparatus.

2. Description of Related Art

FIG. 1 is a schematic diagram of a conventional light emitting diode (LED) driving apparatus 100. In the LED driving apparatus 100, in order to drive a LED string 130 to produce a normal brightness, a power converter 120 of the LED driving apparatus 100 receives and transmits a cross voltage of the conducted LED string 130 through a current driver 122 to serve as a reference voltage VFB, and the LED driving apparatus 100 adjusts a magnitude of a driving voltage Vout according to the reference voltage VFB.

On the other hand, the LED driving apparatus 100 further receives a dimming status signal DIM for dimming the LED string 130. Namely, when the dimming status signal DIM instructs the LED 130 to stop emitting light, a pulse width modulation (PWM) signal PWM generated by a power conversion controller 121 turns off a power transistor switch T1 to stop power conversion. Meanwhile, the driving voltage Vout decreases along with time. When the dimming status signal DIM instructs the LED 130 to start emitting light, the power conversion controller 121 generates the effective PWM signal PWM according to the reference voltage VFB and a feedback voltage OVS to switch the power transistor switch T1 to reactivate the power conversion operation, so that the driving voltage Vout is increased.

During the operation of the LED driving apparatus 100, if a time duration that the dimming status signal DIM instructs the LED string 130 to stop emitting light is excessively long, the driving voltage Vout is greatly decreased, and when the LED string 130 is restarted to emit light, in order to quickly increase the driving voltage Vout, an inductor L1 of the power converter 120 may generate a large inducting current IL. Such derived large inducting current IL may cause a severe electromagnetic interference (EMI), and may also cause damage of components in the LED driving apparatus 100.

SUMMARY OF THE INVENTION

The invention is directed to a light emitting diode (LED) driving apparatus, which can mitigate an over current phenomenon generated in the LED driving apparatus when a dimming status is changed.

The invention is directed to a method for holding a driving voltage of a LED, which can mitigate an over current phenomenon generated in a driving apparatus when a dimming status is changed.

The invention provides a LED driving apparatus including a power converter, a voltage sample-and-hold and comparison circuit, and a pre-charge clock generator. The power converter has a power transistor switch. The power converter receives an input voltage and performs power conversion through the power transistor switch, so as to output a driving voltage at an output terminal of the LED driving apparatus. The voltage sample-and-hold and comparison circuit is coupled to the output terminal for receiving a feedback voltage generated according to the driving voltage. The voltage sample-and-hold and comparison circuit receives a dimming status signal and enters a sample-and-hold mode and a comparing mode according to the dimming status signal, respectively. The voltage sample-and-hold and comparison circuit samples and holds the feedback voltage to obtain a pre-storage voltage in the sample-and-hold mode, and compares the pre-storage voltage with the feedback voltage to obtain a comparison result in the comparing mode. The voltage sample-and-hold and comparison circuit generates a pre-charge enable signal according to the comparison result. The pre-charge clock generator is coupled to the voltage sample-and-hold and comparison circuit, and receives the pre-charge enable signal and a clock signal to generate a pre-charge clock signal to control the power transistor switch.

The invention provides a method for holding a driving voltage of a LED, where the driving voltage is generated by a power transistor switch of a power converter through power conversion. The method includes following steps. A sample-and-hold mode and a comparing mode are respectively executed according to a dimming status signal. A feedback voltage is sampled and held to obtain a pre-storage voltage in the sample-and-hold mode, where the feedback voltage is generated according to the driving voltage. Moreover, the pre-storage voltage is compared with the feedback voltage to obtain a comparison result in the comparing mode. Then, a pre-charge enable signal is generated according to the comparison result, and a pre-charge clock signal is generated according to the pre-charge enable signal and a clock signal to control the power transistor switch.

According to the above descriptions, in a dimming on state, the feedback voltage generated according to the driving voltage of the LED is sampled and held to generate the pre-storage voltage. In a dimming off state, the pre-storage voltage and the feedback voltage are compared to determine whether or not to generate the pre-charge clock signal to stable a voltage value of the driving voltage. In this way, the voltage value of the driving voltage does not have excessive voltage drop due to excessively long time of the dimming off state, and when the dimming on state is re-entered, excessively large current generated by an inductor in the LED driving apparatus is avoided, so as to avoid a severe electromagnetic interference (EMI).

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
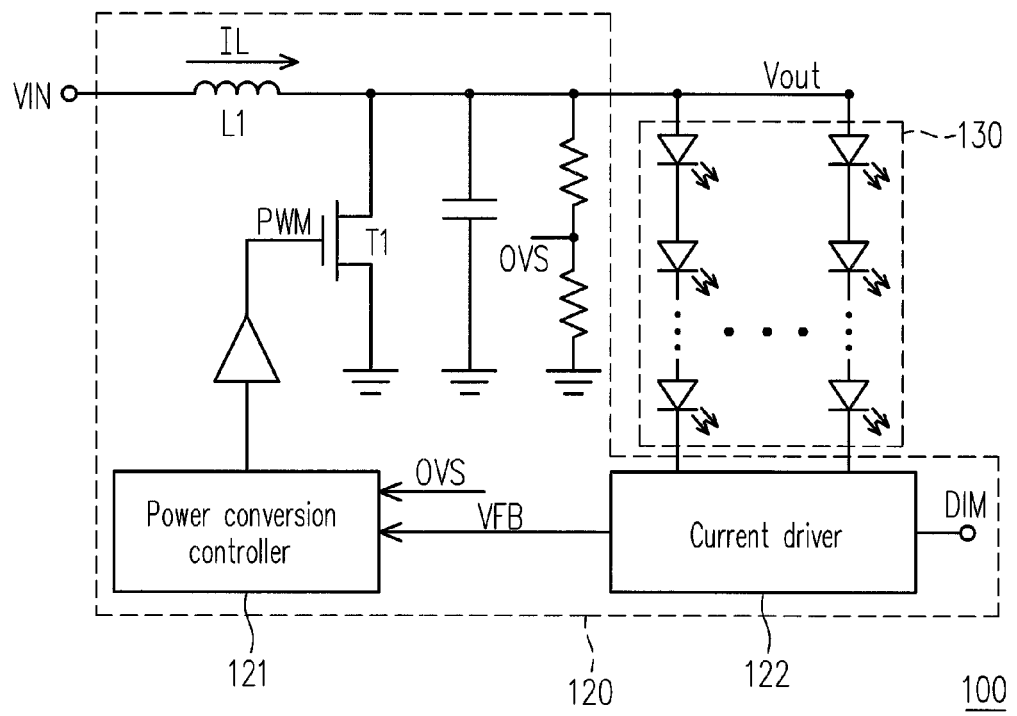
FIG. 1 is a schematic diagram of a conventional light emitting diode (LED) driving apparatus 100.
Figure 2:
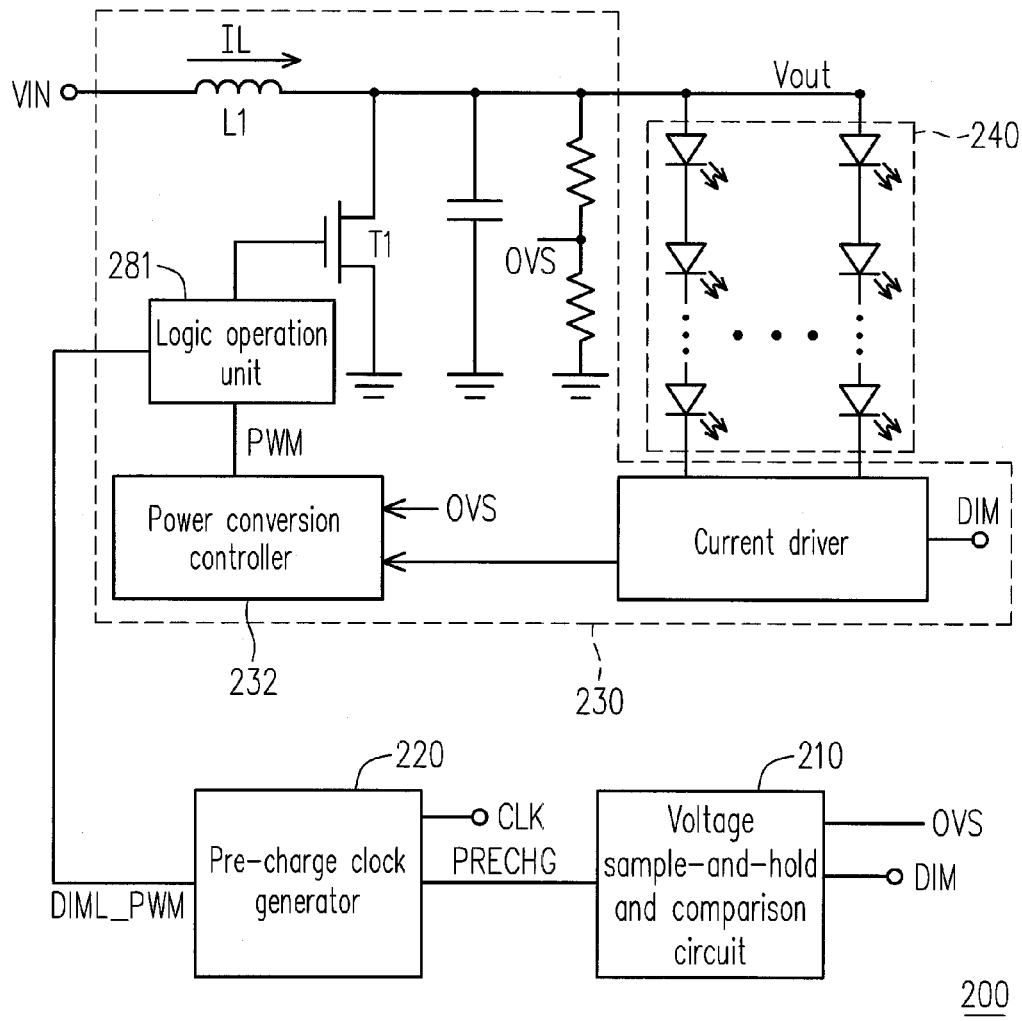
FIG. 2 is a schematic diagram of a LED driving apparatus 200 according to an embodiment of the invention.

Referring to FIG. 2, FIG. 2 is a schematic diagram of a light emitting diode (LED) driving apparatus 200 according to an embodiment of the invention. The LED driving apparatus 200 includes a voltage sample-and-hold and comparison circuit 210, a pre-charge clock generator 220 and a power converter 230. The power converter 230 includes a power transistor switch T1. The power converter 230 receives an input voltage VIN and performs power conversion by turning on or off the power transistor switch T1, so as to output a driving voltage Vout at an output terminal of the LED driving apparatus 200 for driving a LED string 240.

The voltage sample-and-hold and comparison circuit 210 is coupled to the output terminal of the LED driving apparatus 200 for receiving a feedback voltage OVS generated according to the driving voltage Vout. In the present embodiment, the feedback voltage OVS is generated by dividing a voltage level of the driving voltage Vout. The voltage sample-and-hold and comparison circuit 210 receives a dimming status signal DIM and enters a sample-and-hold mode or a comparing mode according to the dimming status signal DIM. In detail, when the voltage sample-and-hold and comparison circuit 210 enters the sample-and-hold mode, the voltage sample-and-hold and comparison circuit 210 samples and holds the feedback voltage OVS to obtain a pre-storage voltage. Moreover, when the voltage sample-and-hold and comparison circuit 210 enters the comparing mode, the voltage sample-and-hold and comparison circuit 210 compares the pre-storage voltage with the feedback voltage to obtain a comparison result, and generates a pre-charge enable signal PRECHG according to the comparison result.

The comparison result is determined by calculating a difference of the pre-storage voltage and the feedback voltage OVS, and when the feedback voltage OVS is smaller than a predetermined threshold of the pre-storage voltage, a determination result for enabling the pre-charge enable signal PRECHG is generated, and when the feedback voltage OVS is greater than or equal to the predetermined threshold of the pre-storage voltage, a determination result for disenabling the pre-charge enable signal PRECHG is generated. The predetermined threshold can be set by a designer according to an actual requirement. Certainly, the predetermined threshold can be set to 0.

It should be noticed that when the dimming status signal DIM instructs the LED driving apparatus 200 to enter a dimming on state, a power conversion controller 232 in the power converter 230 generates an effective pulse width modulation (PWM) signal PWM to switch the power transistor switch T1 to generate the driving voltage Vout, so as to drive the LED string 240. Comparatively, when the dimming status signal DIM instructs the LED driving apparatus 200 to enter a dimming off state, the power conversion controller 232 in the power converter 230 does not generate the effective PWM signal PWM. Namely, in the dimming off state, the power transistor switch T1 is not switched according to the signal PWM.

The pre-charge clock generator 220 is coupled to the voltage sample-and-hold and comparison circuit 210. The pre-charge clock generator 220 receives the pre-charge enable signal PRECHG generated by the voltage sample-and-hold and comparison circuit 210, and generates a pre-charge clock signal DIML_PWM according to the pre-charge enable signal PRECHG and a clock signal CLK. The pre-charge clock signal DIML_PWM generated by the pre-charge clock generator 220 is transmitted to a gate (a control terminal) of the power transistor switch T1 of the power converter 230, so that when the dimming status signal DIM instructs the LED driving apparatus 200 to enter the dimming off state, the pre-charge clock signal DIML_PWM generated by the pre-charge clock generator 220 can be used to switch the power transistor switch T1.

In this way, the driving voltage Vout in the dimming off state can be maintained to a same voltage level as that of the driving voltage Vout in the dimming on state. Therefore, when the LED driving apparatus 200 re-enters the dimming on state, generation of a large inducting current IL for quickly increasing the driving voltage Vout is avoided.

Moreover, in order to respectively provide the pre-charge clock signal DIML_PWM and the PWM signal PWM to the control terminal of the power transistor switch T1 in different states (i.e. the dimming off state and the dimming on state), the power converter 230 further includes a logic operation unit 281. The logic operation unit 281 is used to respectively select and transmit the pre-charge clock signal DIML_PWM and the signal PWM to the control terminal of the power transistor switch T1 during the dimming off state and the dimming on state. For example, the logic operation unit 281 can be a selector or an OR gate.

Figure 3:
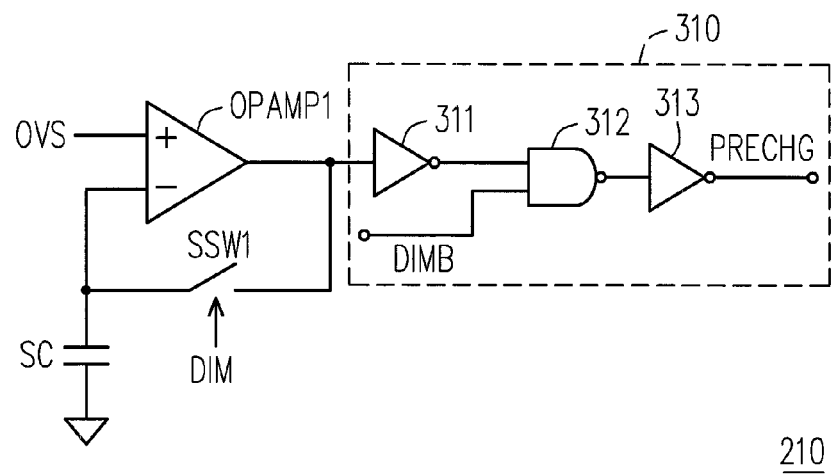
FIG. 3 is a schematic diagram of a voltage sample-and-hold and comparison circuit 210 according to an embodiment of the invention.

Referring to FIG. 3, FIG. 3 is a schematic diagram of the voltage sample-and-hold and comparison circuit 210 according to an embodiment of the invention. The voltage sample-and-hold and comparison circuit 210 includes an operation amplifier OPAMP1, a mode selection switch SSW1 and a hold capacitor SC. The operation amplifier OPAMP1 has a first input terminal, a second input terminal and an output terminal, where the first input terminal thereof receives the feedback voltage OVS, and the mode selection switch SSW1 is coupled in series between the output terminal and the second input terminal of operation amplifier OPAMP1. The mode selection switch SSW1 receives the dimming status signal DIM and is turned on or turned off in response to the dimming status signal DIM. In brief, when the dimming status signal DIM instructs the LED driving apparatus 200 to enter the dimming off state, the mode selection switch SSW1 is turned off. Comparatively, when the dimming status signal DIM instructs the LED driving apparatus 200 to enter the dimming on state, the mode selection switch SSW1 is turned on.

The hold capacitor SC is coupled in series between the second input terminal of the operation amplifier OPAMP1 and ground GND for storing the pre-storage voltage.

It should be noticed that when the mode selection switch SSW1 is turned on, the operation amplifier OPAMP1 is coupled as a so-called unit gain buffer. Now, the feedback voltage OVS is transmitted to and stored in the hold capacitor SC through the output terminal of the operation amplifier OPAMP1. In case that the mode selection switch SSW1 is continually conducted, and the feedback voltage OVS is changed, the voltage stored in the hold capacitor SC is changed accordingly. At a transient when the mode selection switch SSW1 is turned off according to the dimming status signal DIM, the voltage stored in the hold capacitor SC is the pre-storage voltage.

When the mode selection switch SSW1 is turned off, the operation amplifier OPAMP1 is coupled as a comparator. Now, the operation amplifier OPAMP1 compares the feedback voltage OVS received from the first input terminal thereof with the pre-storage voltage received from the second input terminal thereof, and generates the comparison result at the output terminal of the operation amplifier OPAMP1.

The voltage sample-and-hold and comparison circuit 210 further includes a logic operation circuit 310. The logic operation circuit 310 is coupled to the output terminal of the operation amplifier OPAMP1 for receiving the comparison result. The logic operation circuit 310 receives an inverted dimming status signal DIMB and generates the pre-charge enable signal PRECHG according to the inverted dimming status signal DIMB and the comparison result.

In the present embodiment, the logic operation circuit 310 includes a NOT gate 311, a NAND gate 312 and a NOT gate 313. The NOT gate 311 receives the comparison result, and the NAND gate 312 receives an output of the NOT gate 311 and the inverted dimming status signal DIMB inverted to the dimming status signal DIM. The NOT gate 313 receives an output of the NAND gate 312 and generates the pre-charge enable signal PRECHG. When the dimming status signal DIM has a logic low level to couple the operation amplifier OPAMP1 as the comparator, and when the comparison result has a logic high level (the feedback voltage OVS is not smaller than the pre-storage voltage), the logic operation circuit 310 generates the disabled (i.e. logic low level) pre-charge enable signal PRECHG. Comparatively, when the dimming status signal DIM has the logic low level to couple the operation amplifier OPAMP1 as the comparator, and when the comparison result has the logic low level (the feedback voltage OVS is smaller than the pre-storage voltage), the logic operation circuit 310 generates the enabled (i.e. logic high level) pre-charge enable signal PRECHG.

Figure 4:
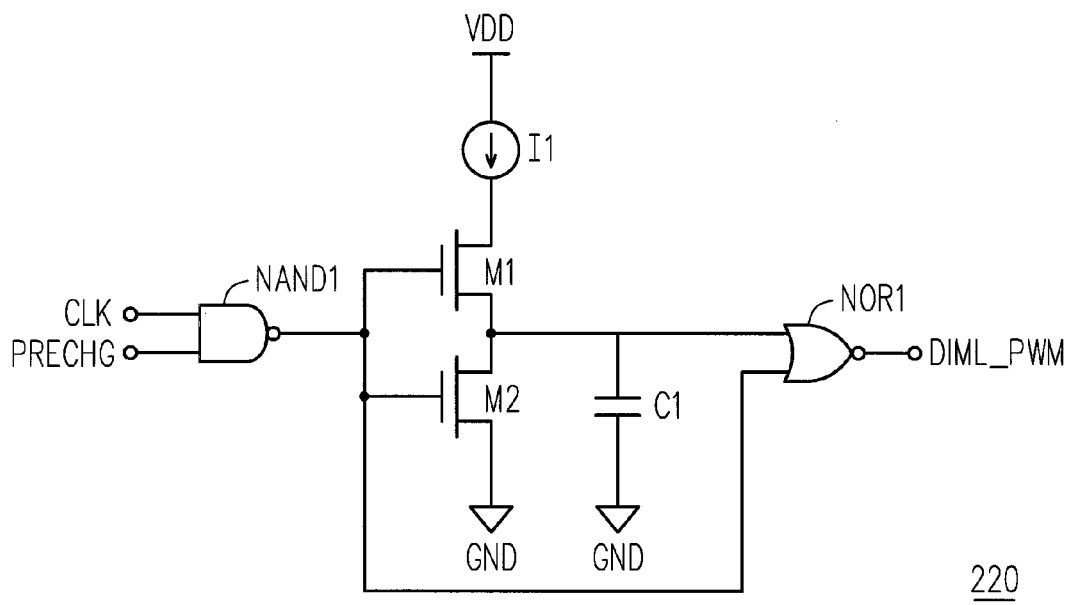
FIG. 4 is a schematic diagram of a pre-charge clock generator 220 according to an embodiment of the invention.

Referring to FIG. 4, FIG. 4 is a schematic diagram of the pre-charge clock generator 220 according to an embodiment of the invention. The pre-charge clock generator 220 includes a NAND gate NAND1, transistors M1 and M2, a current source I1, a capacitor C1 and a NOR gate NOR1. An input terminal of the NAND gate NAND1 receives the clock signal CLK, and another input terminal thereof receives the pre-charge enable signal PRECHG. The transistor M1 has a first terminal, a second terminal and a control terminal, wherein the control terminal is coupled to the output terminal of the NAND gate NAND1. The transistor M2 also has a first terminal, a second terminal and a control terminal, where the control terminal of the transistor M2 is coupled to the output terminal of the NAND gate NAND1, the first terminal of the transistor M2 is coupled to the second terminal of the transistor M1, and the second terminal of the transistor M2 is coupled to the ground GND. The current source I1 is coupled in series between a power voltage VDD and the first terminal of the transistor M1. The capacitor C1 is coupled in series between the first terminal of the transistor M2 and the ground GND. An input terminal of the NOR gate NOR1 is coupled to the first terminal of the transistor M2, a second input terminal of the NOR gate NOR1 is coupled to the control terminals of the transistors M1 and M2, and an output terminal of the NOR gate NOR1 generates the pre-charge clock signal DIM-L_PWM.

Figure 5:
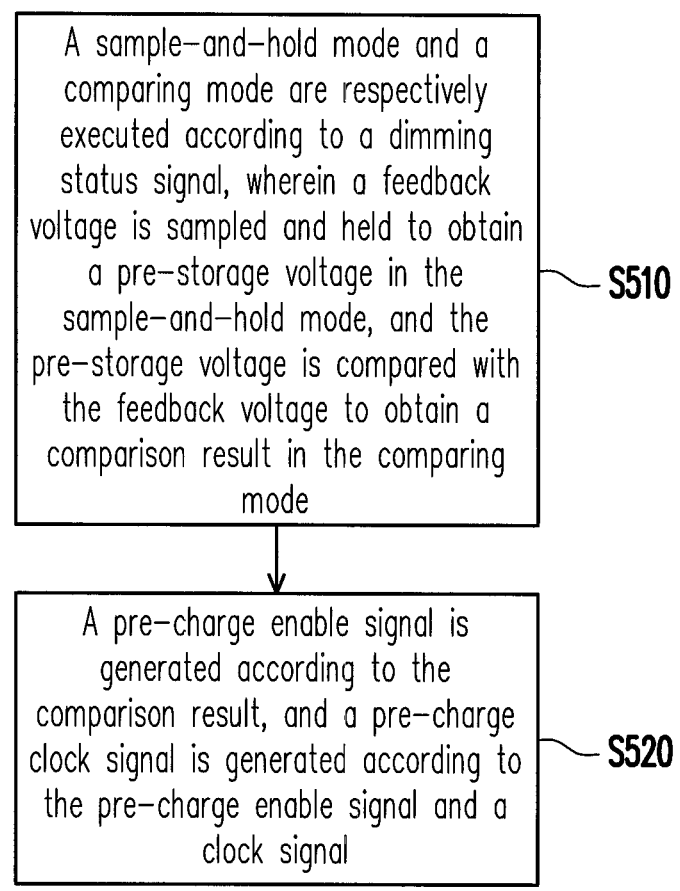
FIG. 5 is a flowchart illustrating a method for holding a driving voltage of a LED according to another embodiment of the invention.

Referring to FIG. 5, FIG. 5 is a flowchart illustrating a method for holding a driving voltage of a LED according to another embodiment of the invention. The driving voltage is generated by a power transistor switch of a power converter through power conversion. The method includes following steps. First, a sample-and-hold mode and a comparing mode are respectively executed according to a dimming status signal, where a feedback voltage is sampled and held to obtain a pre-storage voltage in the sample-and-hold mode, and the feedback voltage is generated according to the driving voltage. Moreover, the pre-storage voltage is compared with the feedback voltage to obtain a comparison result in the comparing mode (S510).

Moreover, a pre-charge enable signal is generated according to the comparison result generated in the step S510, and a pre-charge clock signal is generated according to the pre-charge enable signal and a clock signal to control the power transistor switch (S520).

An implementation of the method for holding the driving voltage of the LED is provided below for those skilled in the art.

Figure 6:
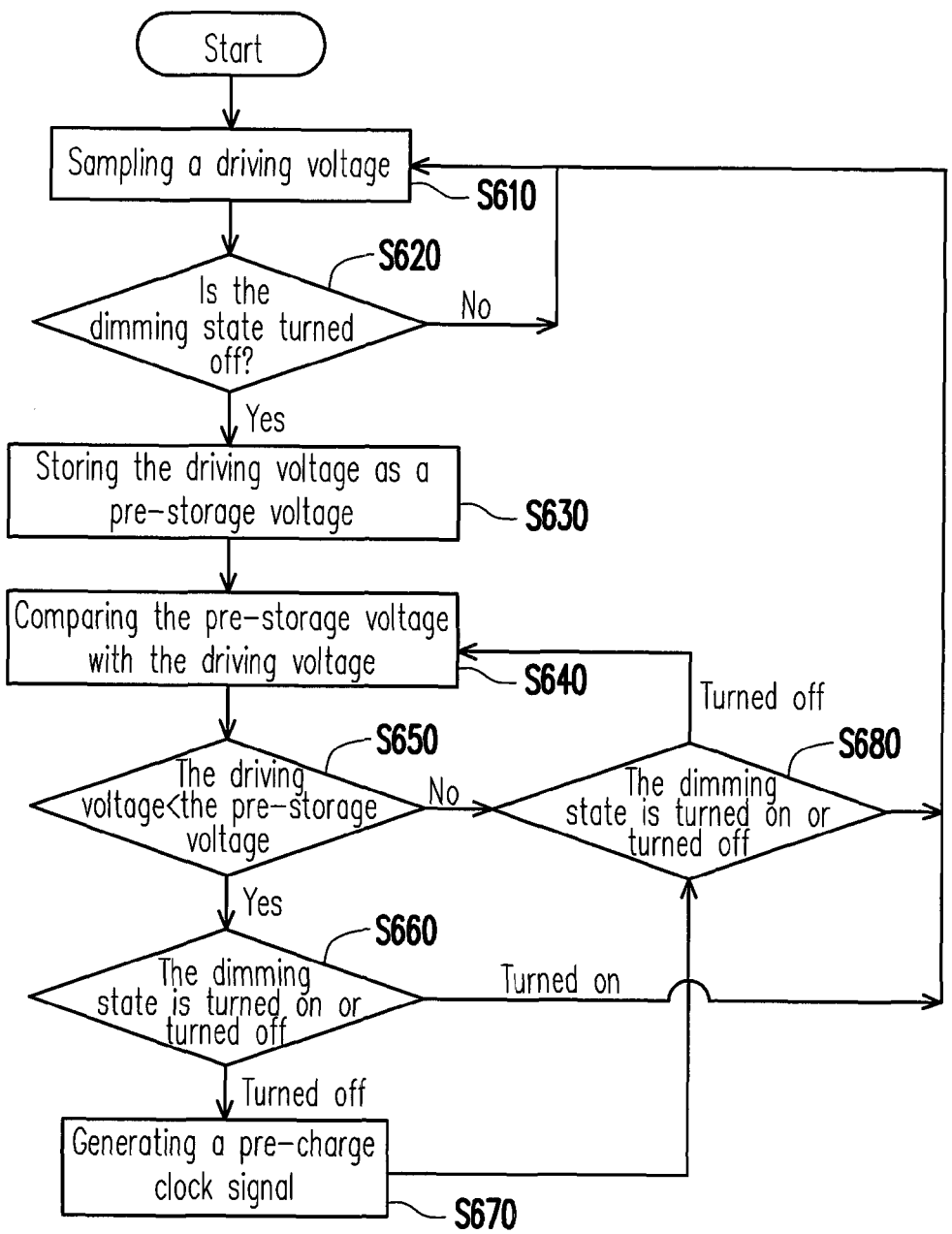
FIG. 6 is a flowchart illustrating an implementation of a method for holding a driving voltage of a LED according to an embodiment of the invention.

Referring to FIG. 6, FIG. 6 is a flowchart illustrating an implementation of a method for holding a driving voltage of a LED according to an embodiment of the invention. First, when the LED is maintained in a dimming on state, the driving voltage is sampled (S610), and during the sampling process, it is detected whether the LED is in the dimming on state or a dimming off state (S620). If the LED is maintained in the dimming on state, it is returned to the step S610. Comparatively, if the LED is switched from the dimming on state to the dimming off state, at a transient when the dimming on state is switched to the dimming off state, the driving voltage is stored as a pre-storage voltage (S630).

After the pre-storage voltage is obtained, the pre-storage voltage is compared with the driving voltage in the dimming off state (S640), and it is determined whether the driving voltage is smaller than the pre-storage voltage (S650). When the driving voltage is smaller than the pre-storage voltage, and when the LED is in the dimming off state (S660), a pre-charge clock signal is generated (S670). Comparatively, when the driving voltage is not smaller than the pre-storage voltage, it is determined whether the LED is continually maintained in the dimming off state (S680), and if the LED is continually maintained in the dimming off state, it is returned to the step S630, and if the LED is switched to the dimming on state, it is returned to the step S610.

In summary, in the dimming on state, the feedback voltage generated according to the driving voltage of the LED is sampled, and the feedback voltage in the dimming on state is stored as the pre-storage voltage. In the dimming off state, the pre-storage voltage and the feedback voltage are compared to generate the pre-charge clock signal to control the power transistor switch to continually perform the power conversion operation, so as to prevent excessive voltage drop of the driving voltage, and avoid a large current phenomenon generated when the dimming on state is reactivated, so as to avoid generation of an electro-magnetic interference (EMI).

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A light emitting diode (LED) driving apparatus, comprising:
a power converter, having a power transistor switch, and receiving an input voltage and performing power conversion through the power transistor switch, so as to output a driving voltage at an output terminal of the LED driving apparatus;

a voltage sample-and-hold and comparison circuit, coupled to the output terminal for receiving a feedback voltage generated according to the driving voltage, and receiving a dimming status signal and entering a sample-and-hold mode or a comparing mode according to the dimming status signal, wherein the voltage sample-and-hold and comparison circuit samples and holds the feedback voltage to obtain a pre-storage voltage in the sample-and-hold mode, and compares the pre-storage voltage with the feedback voltage to obtain a comparison result in the comparing mode; and a pre-charge clock generator, coupled to the voltage sample-and-hold and comparison circuit, for receiving the pre-charge enable signal and a clock signal to generate a pre-charge clock signal to control the power transistor switch.

2. The LED driving apparatus as claimed in claim 1, wherein when the dimming status signal instructs the LED driving apparatus to enter a dimming on state, the voltage sample-and-hold and comparison circuit enters the sample-and-hold mode, and when the dimming status signal instructs the LED driving apparatus to enter a dimming off state, the voltage sample-and-hold and comparison circuit enters the comparing mode.

3. The LED driving apparatus as claimed in claim 1, wherein the voltage sample-and-hold and comparison circuit enables the pre-charge enable signal when the feedback voltage is smaller than a predetermined threshold of the pre-storage voltage.

4. The LED driving apparatus as claimed in claim 3, wherein the pre-charge clock generator generates the pre-charge clock signal according to the clock signal when the pre-charge enable signal is enabled.

5. The LED driving apparatus as claimed in claim 1, wherein the voltage sample-and-hold and comparison circuit comprises:
an operation amplifier, having a first input terminal, a second input terminal and an output terminal, wherein the first input terminal receives the feedback voltage;
a mode selection switch, coupled in series between the output terminal and the second input terminal of the operation amplifier, and being turned on or turned off in response to the dimming status signal; and
a hold capacitor, coupled in series between the second input terminal of the operation amplifier and ground, for storing the pre-storage voltage.

6. The LED driving apparatus as claimed in claim 5, wherein the voltage sample-and-hold and comparison circuit further comprises:
a logic operation circuit, coupled to the output terminal of the operation amplifier for receiving the comparison result, and receiving the dimming status signal and generating the pre-charge enable signal according to the dimming status signal and the comparison result.

7. The LED driving apparatus as claimed in claim 1, wherein the pre-charge clock generator comprises:

a NAND gate, having a first input terminal receiving the clock signal, and a second input terminal receiving the pre-charge enable signal;
a first transistor, having a first terminal, a second terminal and a control terminal, wherein the control terminal thereof is coupled to an output terminal of the NAND gate;
a second transistor, having a first terminal, a second terminal and a control terminal, wherein the control terminal thereof is coupled to the output terminal of the NAND gate, the first terminal thereof is coupled to the second terminal of the first transistor, and the second terminal thereof is coupled to ground;
a current source, coupled in series between a power voltage and the first terminal of the first transistor;
a capacitor, coupled in series between the first terminal of the second transistor and the ground; and
a NOR gate, having a first input terminal coupled to the first terminal of the second transistor, a second input terminal coupled to the control terminals of the first and the second transistors, and an output terminal generating the pre-charge clock signal.

8. A method for holding a driving voltage of a light emitting diode (LED), wherein the driving voltage is generated by a power transistor switch of a power converter through power conversion, and the method for holding the driving voltage of the LED comprising:
respectively executing a sample-and-hold mode and a comparing mode according to a dimming status signal, wherein a feedback voltage is sampled and held to obtain a pre-storage voltage in the sample-and-hold mode, wherein the feedback voltage is generated according to the driving voltage, and the pre-storage voltage is compared with the feedback voltage to obtain a comparison result in the comparing mode; and
generating a pre-charge enable signal according to the comparison result, and generating a pre-charge clock signal according to the pre-charge enable signal and a clock signal to control the power transistor switch.

9. The method for holding the driving voltage of the LED as claimed in claim 8, wherein the sample-and-hold mode is executed when the dimming status signal instructs the LED to enter a dimming on state, and the comparing mode is executed when the dimming status signal instructs the LED to enter a dimming off state.

10. The method for holding the driving voltage of the LED as claimed in claim 8, wherein the step of generating the pre-charge enable signal according to the comparison result comprises:
enabling the pre-charge enable signal when the feedback voltage is smaller than a predetermined threshold of the pre-storage voltage.

11. The method for holding the driving voltage of the LED as claimed in claim 10, wherein the step of generating the pre-charge clock signal according to the pre-charge enable signal and the clock signal comprises:
generating the pre-charge clock signal according to the clock signal when the pre-charge enable signal is enabled.

* * * * *